United States Patent
Abbadessa et al.

(10) Patent No.: US 9,483,809 B2
(45) Date of Patent: Nov. 1, 2016

(54) METHOD AND SYSTEM FOR IDENTIFYING CONTENT

(75) Inventors: Daniele Abbadessa, Heidelberg (DE); Miquel Martin Lopez, Ludwigshafen (DE)

(73) Assignee: NEC CORPORATION, Tokyo (JP)

( * ) Notice: Subject to any disclaimer, the term of this patent is extended or adjusted under 35 U.S.C. 154(b) by 124 days.

(21) Appl. No.: 14/359,131

(22) PCT Filed: Mar. 21, 2012

(86) PCT No.: PCT/EP2012/054997
§ 371 (c)(1),
(2), (4) Date: Jun. 26, 2014

(87) PCT Pub. No.: WO2013/072076
PCT Pub. Date: May 23, 2013

(65) Prior Publication Data
US 2014/0334664 A1    Nov. 13, 2014

(30) Foreign Application Priority Data
Nov. 18, 2011 (EP) ..................................... 11189786

(51) Int. Cl.
*G06T 1/00* (2006.01)
*G06Q 10/00* (2012.01)
*H04N 21/8358* (2011.01)

(52) U.S. Cl.
CPC .............. *G06T 1/0021* (2013.01); *G06Q 10/00* (2013.01); *H04N 21/8358* (2013.01); *G06T 2201/0065* (2013.01)

(58) Field of Classification Search
None
See application file for complete search history.

(56) References Cited

U.S. PATENT DOCUMENTS

| | | | |
|---|---|---|---|
| 7,881,657 B2 | 2/2011 | Wang et al. | |
| 7,970,167 B2 | 6/2011 | Rhoads | |
| 2003/0012548 A1* | 1/2003 | Levy .................... | G06F 21/125 386/251 |
| 2005/0058319 A1 | 3/2005 | Rhoads et al. | |
| 2006/0031684 A1 | 2/2006 | Sharma et al. | |
| 2010/0205628 A1 | 8/2010 | Davis et al. | |

OTHER PUBLICATIONS

International Search Report, dated Jul. 18, 2012, from corresponding PCT application.

* cited by examiner

Primary Examiner — Jon Chang
(74) Attorney, Agent, or Firm — Young & Thompson

(57) ABSTRACT

Disclosed is a method for identifying content, preferably media content for publishing including the steps of a) Providing a content element for a user, b) Marking the content element with a global mark, c) Marking the content element with a local mark, d) Presenting the marked content element, e) Detecting at least part of the presented content element, f) Extracting the global mark and the local mark from the detected part of the content element, g) Identifying the extracted local mark and the global mark, and h) Identifying the content element based on the global and local mark. The invention relates also to a corresponding system and a use of the method and the system.

20 Claims, 3 Drawing Sheets

METHOD AND SYSTEM FOR IDENTIFYING CONTENT

BACKGROUND OF THE INVENTION

1. Field of the Invention

The invention relates to a method and a system for identifying content, preferably media content for publishing.

2. Description of the Related Art

Although applicable to all sorts of content the invention will be described with regard to media content. Although applicable to all types of stimuli of the content the invention will be described with regard to audio and/or video content.

Conventional methods and systems today provide services so that a user can use these services to automatically identify media content he is been presented. To identify the media content it is already known to use a watermark in the media content and further to detect the watermark or an automated creation of fingerprint based on a unique characteristic of the media content, for example the popular Shazam application for mobile devices is used. After detecting the watermark in the media content the watermark has to be identified. Because identification is typically performed online, the user respectively the corresponding device sends the detected watermark or fingerprint to a server. In addition to the identification of the watermark, the watermark or mark may be used for providing advertisement related to the media content, for example purchasing an album in an online shop or a statistical collection of data on the popularity of the media content.

Another usage of marks rely on location information provided by a mobile user terminal as a tool to target the media content being offered.

However location information tend to be inaccurate, when for example provided by GPS, WiFi and/or 3G triangulation and the fact that to a great extend media content is being presented indoors. In particular location information based on GPS is then not available. Even if the determination of the location is possible a corresponding location error is big enough to prevent identifying for example a distinctive terminal located in a shop where the media content is presented.

A further disadvantage is, that location information of a user is a very private sensitive information which deserves high protection although it conveys a lot of information needed for a media content customization.

In FIG. 1 a typical conventional system for identifying content is described. A content element 100 is determined to be displayed on a local display 550, 551. Before displaying the content element 100 is watermarked by a watermark generator 210 and distributed with the watermark via a network 400, for example the internet and a local area network of a shop to the two displays 550, 551 for presenting the content element 100. These displays 550, 551 may for example be public displays. A mobile device 600 of a user captures the presented content element 100, for example if the content element 100 is presented via audio, via a microphone in the mobile device 600. An application running on the mobile device 600 extracts the watermark of the captured audio of the content element 100 and sends it back to a watermark resolution server 220. The watermark resolution server 220 matches the watermark against a watermark database 230 and triggers the delivery of additional content 300, for example stored in a database to the mobile device 600 of the user.

Another conventional method for identifying content is to be found in U.S. Pat. No. 7,881,657 B2: A device sends a content identification query, which includes a sample of the content being broadcast to a server to request an identity of the content. The server will perform a computational identification of the content, return the result to the device and store the result. Also a geographic location information may be send to the request server. A location information may also be sent to further enhance the identification of the content, for example to disambiguate the broadcast station.

U.S. Pat. No. 7,970,167 B2 shows a further identification method for content. A processor provides identifying data, wherein the identifying data is derived from sample value representing audible portions of audio or from sample values representing picture portions of a video. The identifying data is provided to a database and advertising information is received from the data base, wherein the advertising information is associated with the audio or video and wherein the advertising information has been identified in the database utilizing the identifying data. The advertising information is then provided via device output. The processor is configured to derive identifying data from the sample values, to provide the identifying data to the database via a network and to receive from the database at least some information from a profile associated with the proprietor of the audio or imagery.

However the conventional methods described have certain drawbacks: As already mentioned location information tends to be rather inaccurate and/or may not be used indoors. Further location information is very privacy sensitive data which a user would not provide without being very essential for himself.

BRIEF SUMMARY OF THE INVENTION

It is therefore an objective of the present invention to provide a method and a system for an identifying content respecting the privacy of a user to a greater extend.

It is a further objective of the present invention to provide a method and a system for identifying content, which are more flexible.

It is an even further objective of the present invention to provide a method and a system for identifying content, which are more reliable with regard to location information of the presentation of content.

In accordance with the invention, the aforementioned objectives are accomplished by a method by a system comprising the features of the claims.

According to the method for identifying content, preferably media content for publishing includes the steps of a) Providing a content element for a user, b) Marking the content element with a global mark, c) Marking the content element with a local mark, d) Presenting the marked content element, e) Detecting at least part of the presented content element, f) Extracting the global mark and the local mark from the detected part of the content element, g) Identifying the extracted local mark and the global mark, and h) Identifying the content element based on the global and local mark.

According a system for identifying content, preferably media content for publishing, and preferably for performing with a method includes content providing means for providing a content element for a user, global marking means for marking the content element with a global mark, local marking means for marking the content element with a local mark, presenting means for presenting the marked content element, a user terminal for detecting at least part of the presented content element, global extraction means for extracting the global mark from the detected part of the presented content element, local extraction means for extracting the local mark from the detected part of the presented content element, and global identification means for identifying the content element based on the global mark and local identification means for identifying the content element based on the local mark.

The method and/or the system is used for proof-of-play and/or for proof-of-attention.

According to the invention it has first been recognized, that an addition of a local mark to a globally marked content element enables in particular to convey information about the situation in which a user consumes a content element.

According to the invention it has further been first recognized, that the method and the system provides an enhanced flexibility for example enabling further uses, in particular cost-per-click advertisements.

According to the invention it has further been first recognized, that the method and the system respects the privacy of a user to a further extend, since the local mark may be not related to a location information of a user but to a location information of the content element being presented at this location.

Further features, advantages and preferred embodiments are described in the following subclaims.

According to a preferred embodiment the presenting of step d) is performed by visually displaying and/or audio play of the content element. If for example the marked content element is presented visually and via audio a user may recognize the content element visually whereas for example a mobile device may capture only the audio play of the content element. This increases the flexibility when identifying the content element based on the global and local mark, since only one option of presenting the content element may be used for example for detecting at least part of the presented content element.

According to a further preferred embodiment the local mark is provided to be a unique identifier for a location of the presenting according to step d). This provides for example an improved location information of content element playout and better metrics to track for example an advertising campaign. A further advantage is, that this increases the possibility to deliver customized and context- or situation-specific advertisement for a user. A further advantage is, that this may provide a proof-of-attention for advertisement broadcasters and an increased efficiency for advertises, enabling, that a content element was not only shown but also listened to.

A further advantage is that this provides a more accurate location of the content presentation location. The unique identifier may for example represent the display for presenting the content element.

According to a further preferred embodiment additional local information is determined. This enables an enhanced identifying of the content element based on the global and local mark and further on the additional local information.

According to a further preferred embodiment the additional local information includes local temperature, local crowd density, local dwell time and/or local noise level. By including local temperature in the additional local information for example drink advertisements could be customized to the (local) temperature of the area where the content element is presented without disclosing a location of said area. For example a display could be chosen to show tea instead of water advertisements. Another example may be, that a user is close to a public display showing a soft drink advertisement: If for example the display is at a railway station and if the temperature is very high reflecting a hot day, information about the location of the closest place which sells cold soft drinks may be shown to the user, if it is very relevant to the user situation. Another option is to print out or send a coupon to a mobile device of the user near the display which may then be used at a supermarket to buy a soft drink.

If the additional local information includes local crowd density the presentation of the marked content element may be reduced in time taking account reduced attention spans in big crowds versus lonesome individuals. Crowd density information may for example be determined by using audience measurement techniques, for example computer vision based face counting.

In case the additional local information includes local dwell time the content element can be customized to the expected attention span. Time of permanence in an area close to a device presenting the marked content element could also be determined by measuring how often a local watermark has been detected. To determine a local dwell time Bluetooth scanning of mobile devices nearby for example may be used.

In case the additional local information includes local noise level this enables also determining a crowd density in the area of the location of the presented content element. Further, the presence of competing content elements or even a potential mood of users may be detected or calculated on the basis of the additional local information.

According to a further preferred embodiment the additional local information is encoded in the local mark. For example by matching the additional local information against a database of installations additional local information can be provided for identifying the content element as accurate as the range of perception of the content element is, for example a radius in which a certain tune can be listened.

According to a further preferred embodiment the additional local content element and/or an additional global content element is provided to a user terminal dependent on a result of step h). This enables more suitable or related content elements for a user enhancing the delivery of customized and situation specific-advertisements to the user terminal of the user.

According to a further preferred embodiment the additional local content element and/or the additional global content element is provided based on the additional local information. This enables an even better adaption to user-specific situations for example offering cold soft drinks on a hot day when incorporating temperature as additional local information.

According to a further preferred embodiment the user is identified and based on the identification of the user the local and/or global content element is provided. If a user identifies himself at the time of detecting at least part of the published content element and extracting the global mark and the local mark the additional local content element and/or the additional global content element could be further personalized to account for the users preferences and habits.

According to a further preferred embodiment of the system, the system includes at least one local sensor for sensing a local physical parameter, preferably a local temperature, a local crowd density, a local dwell time and/or a local noise level. A local sensor enables in an easy and cost effective way determining local physical parameters which may be included as additional local information.

According to a further preferred embodiment the system comprises at least one local cluster each cluster comprising the local marking means, the presenting means, the local identification means and/or the additional local content means and preferably the at least one local sensor. Such a clustering using local clusters may for example be used to be installed as local units in stores providing the necessary elements for marking content elements with a local mark.

According to a further preferred embodiment a global cluster comprises the global marking means, the additional global content means and/or the global identification means. The global cluster provides a unit for example for an online content provider to identify content elements based at least on the global mark.

According to a further preferred embodiment additional local content means and/or additional global content means for providing an additional local content element and/or an additional global content element to the user terminal dependent on a result provided by the global identification means and/or the local identification means are provided. This enables to deliver additional customized and context-specific advertisements for a user. This further provides a provision of better targeted content elements to users.

There are several ways how to design and further develop the teaching of the present invention in an advantageous way. To this end it is to be referred to the patent claims and to the following explanation of preferred embodiments of the invention by way of example, illustrated by the figure. In connection with the explanation of the preferred embodiments of the invention by the aid of the figure, generally preferred embodiments and further developments of the teaching will be explained.

DETAILED DESCRIPTION OF THE PREFERRED EMBODIMENTS

Figure 1:
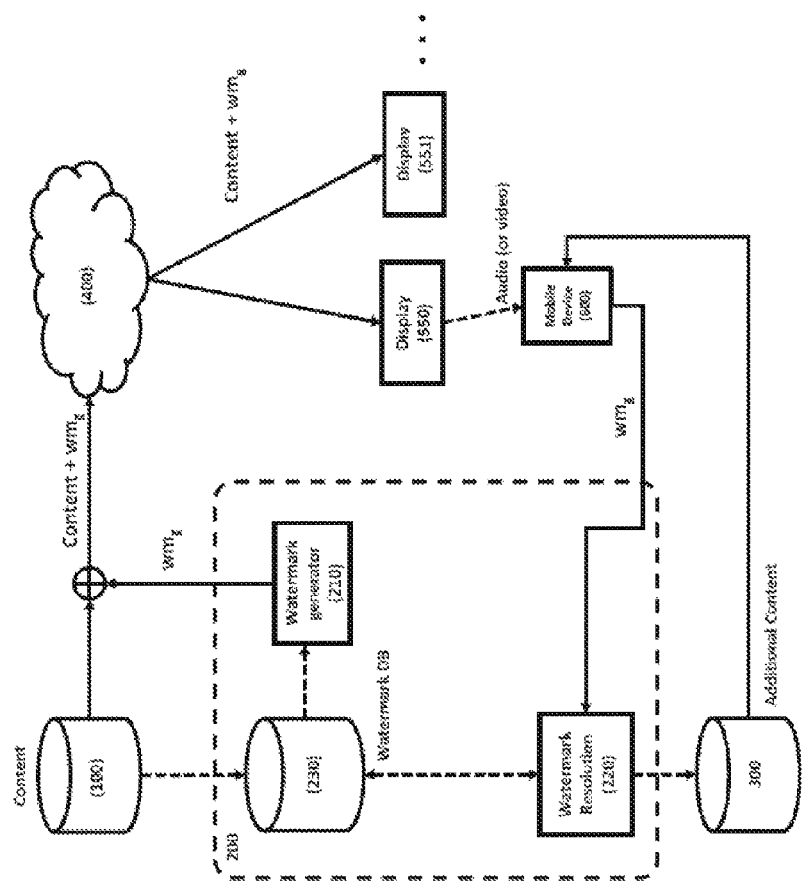
FIG. 1 shows a conventional system for identifying content.

FIG. 1 shows a conventional system for identifying content.

In FIG. 1 a typical conventional system for identifying content elements is described. A content element 100 is determined to be displayed on local display 550, 551. Before displaying the content element 100 is watermarked by a watermark generator 220 and distributed with the watermark via a network 400, for example the internet and a local area network of a shop to two displays 550, 551 for presenting the marked content element. These displays 550, 551 may for example be public displays. A mobile device 600 of a user captures the presented content element, for example if the content is presented via audio, via a microphone in the mobile device 600. The mobile device 600 captures the audio transmitted by the display 550. An application running on the mobile device 600 extracts the watermark and sends it back to a watermark resolution server 220. The watermark resolution server 220 matches the watermark against a watermark database 230 and triggers the delivery of additional content 300 to the mobile device 600 of the user.

Figure 2:
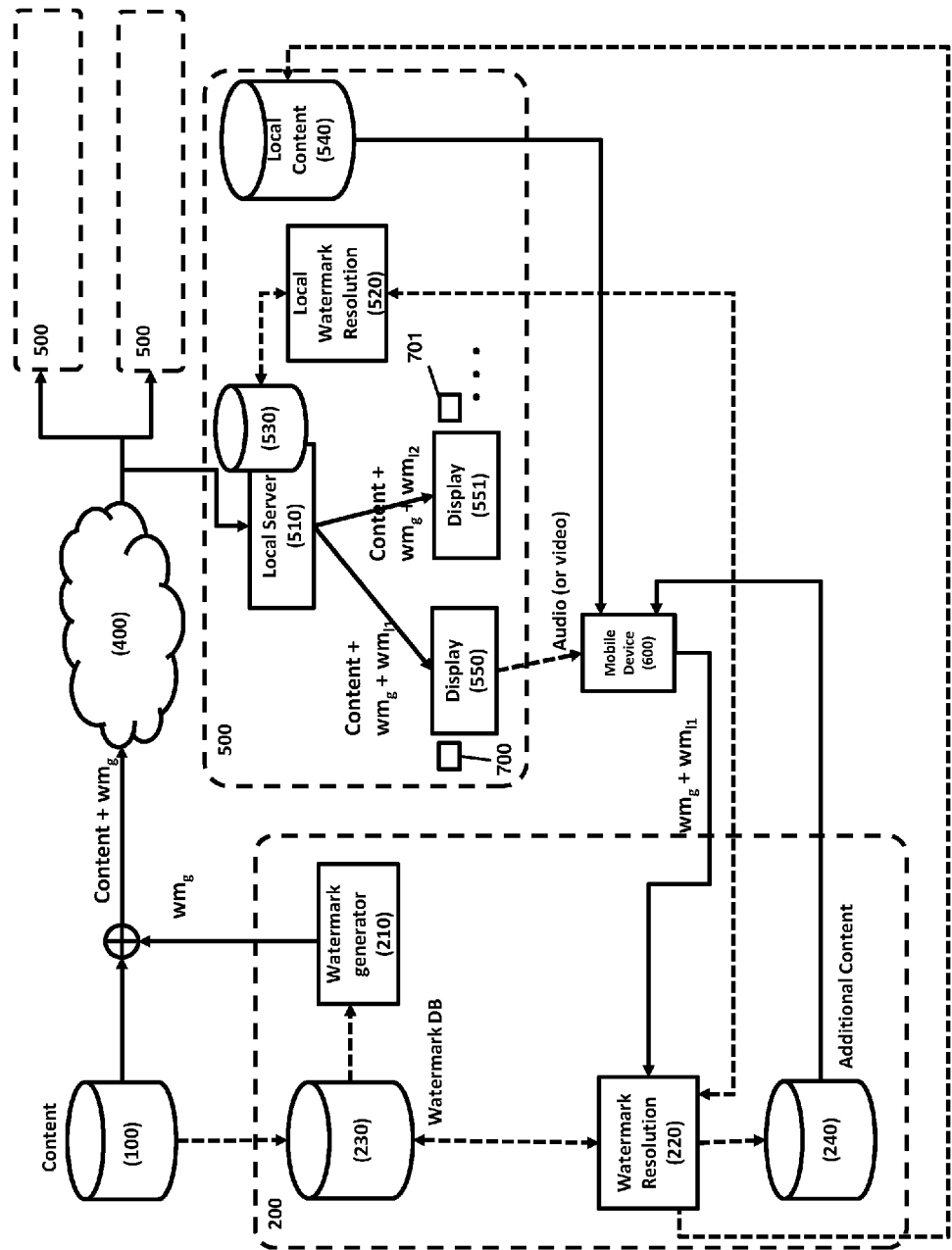
FIG. 2 shows a system according to a first embodiment of the present invention.

FIG. 2 shows a system according to a first embodiment of the present invention.

In FIG. 2 a content element 100 is globally watermarked with a global watermark $wm_g$ by a global watermark generator 210 and distributed via for example the internet 400 to different local clusters 500. Each cluster 500 comprises a local server 510 which is responsible for adding an additional local watermark $wm_{l1}$ to the already globally marked content element that is delivered to each display 550, 551. When presenting the locally and globally marked content element via display 550 the mobile device 600 captures for example the audio transmitted by display 550. An application running on the mobile device 600 will extract the global watermark $wm_g$ added by the watermark generator 210 and the local watermark $wm_{l1}$ added by the local server 510. The two watermarks $wm_g$ and $wm_{l1}$ are transmitted to the watermark resolution server 220. This watermark resolution server 220 will resolve the global watermark $wm_g$ against a respective global watermark database 230. The local watermark $wm_{l1}$ is transmitted by the global watermark resolution server 220 to a corresponding local watermark resolution server 520, which resolves the local watermark $wm_{l1}$ against a local watermark database 530. The result is transmitted back to the global watermark resolution server 220. Based on the specific information returned by the query to the local watermark database 530 the watermark resolution server 220 will decide whether additional global content from the additional global content database 240 and for additional local content from the local content database 540 is delivered to the mobile device 600 of the user.

Further assigned to the displays 550, 551 are two corresponding sensors 700 and 701 which may be used to sense additional information. These sensors 700, 701 may be connected to the local watermark server 510 allowing the sensed data to be encoded in the local watermark $wm_{l1}$, so that the watermark resolution server 220 may extract the additional information and the decision whether additional global content or additional local content respectively which additional local or global content elements are delivered to the mobile device 600 may be based on this additional information.

A local cluster 500 according to FIG. 2 comprises a local server 510, the local watermark resolution server 520, the local watermark database 530 as well as displays 550 and 551 and the sensors 700, 701 associated with the displays 550, 551. Such local clusters are usually located in house or in confined environments, for example railway stations, airports, shopping centers or the like. A global cluster comprising the watermark generator 210, the watermark database 230, the watermark resolution server 220 and additional global content 240 is for example used by content database providers.

Figure 3:
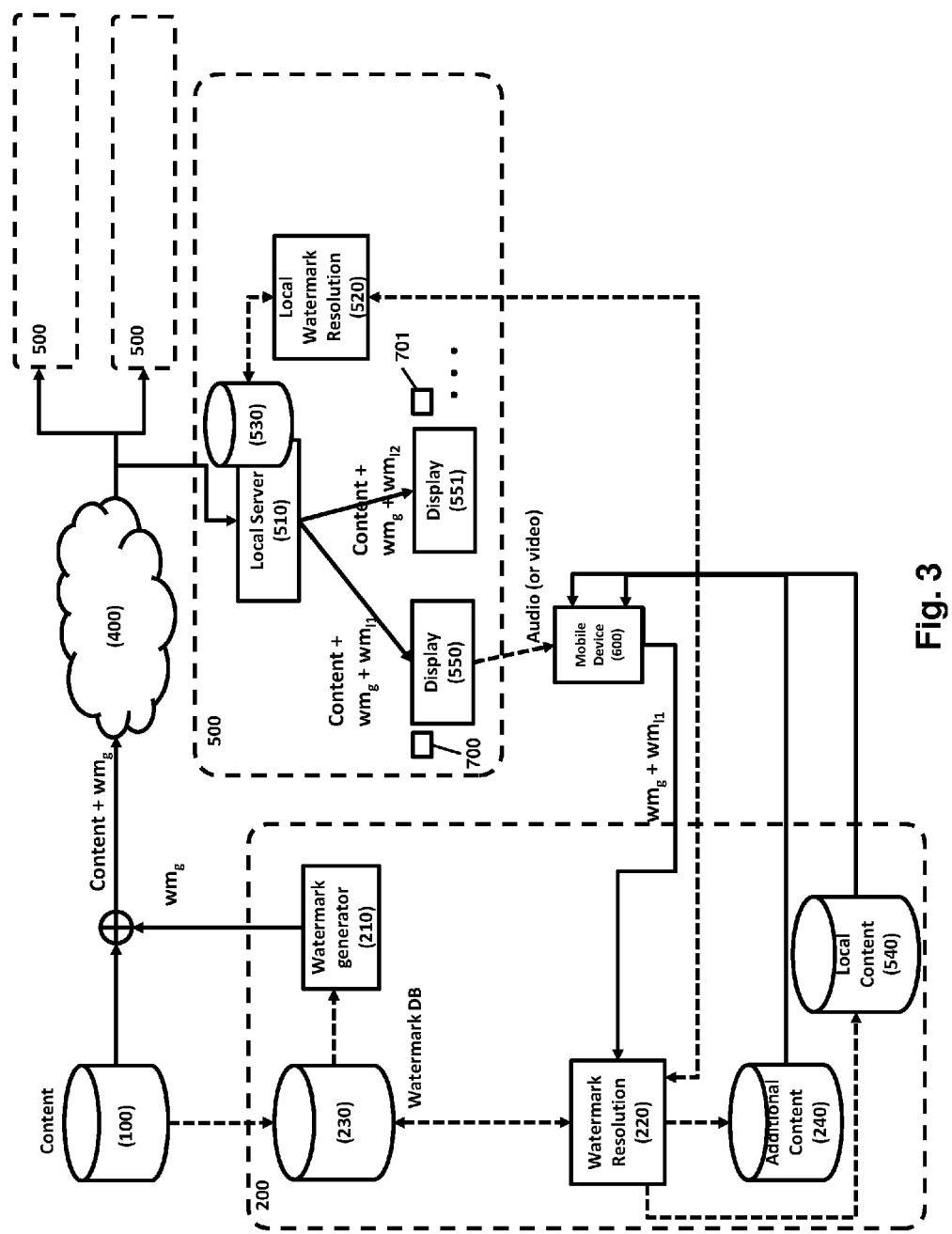
FIG. 3 shows a system for identifying content according to a second embodiment of the present invention.

FIG. 3 shows a system for identifying content according to a second embodiment of the present invention.

In FIG. 3 is in general shown a system according to FIG. 2 in contrast to the system of FIG. 2 the local content database 540 is located in the global cluster 200 in FIG. 3.

In summary the present invention provides an addition of local marks to globally watermarked content element with contextual information that either identify a player of the content element or information about the context or situation around it. The present invention further provides a selection of additional content elements to deliver to users taking also into account local context/information. The present invention further provides users with secondary content elements matching their preferences and local context/situation. A proof-of-play technology using a large number of neutral third parties to access whether content was played or not is also provided and even a mechanism to provide cost-per-click data in digital signage.

The present invention further provides the following features and advantages:
1) A "local" watermark which enables to convey information about the "context" in which the user is consuming the content element, preferably a multimedia content element, preferably a multimedia content element,
2) An increased possibility to deliver customized and context-specific advertisement,
3) Creation of a watermarking system based on "global" and "local" watermarks,
4) A localization where the content element was actually shown by the secondary watermark. This means that the problem to provide a localization information need not to be handled by the original content element creator, but rather by local entities that handle the secondary watermarks, thus distributing the effort and increasing the scalability.

Further the present invention enables
5) Numerous, neutral providers of Proof-of-play information,
6) A more accurate location on the content playout location,
7) A proof-of-attention, showing that certain content elements were not only shown, but also listened to increasing the revenue for advertisement broadcasters and the efficiency for advertisers,
8) An improved location of content playouts, which provides better metrics to track a campaign,
9) Better targeted content elements to users thanks to the available contextual information,
10) Independent, non conflict-of-interest tainted Proof-of-play data,
11) A Cost-per-Click advertisement, as well as
12) New business models resulting from the additional information provided by localized marks. For example, one could organize games that encourage the users to travel from location to location. This could be used for example, as part of movie pre-release campaigns that strive to capture the fans' attention with even more imaginative setups.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The present invention may be further be used as a "crowd-sourced" "proof-of-play" system in that the crowd, for example neutral, non interested users, provide large amounts of proof-of-play data. Because of the number and the neutral nature of these "data providers" this enables to provide reliable evidence, that the content or content elements where indeed played out. If the number of reports by the "data providers" in form of the users is high enough it also conveys information on the number of people that actually pay attention to the content elements being played. This may be used for example as another metric on which advertising pricing can be calculated for example by cost per impression or cost per Mille as opposed to cost per click where click means in a generalization "attention".

Cost per Mille refers to the cost of an advertisement that is shown a certain number of times, for example a newspaper ad or a website banner as opposed to cost per click, which is only paid when someone actually paid attention to it, for example a use of a coupon in the newspaper or clicks on web banners. Cost-per-click is significantly higher than cost per Mille and therefore having this information increases the revenues for the advertisement broadcaster and the efficiency of the advertisers.

The invention claimed is:

1. A method for identifying content, performed by a computing device, the method comprising the steps of:
   a) marking a content element with a global mark by a global watermark generation device;
   b) marking the content element with a local mark by a local server in a local cluster;
   c) presenting the marked content element;
   d) detecting at least part of the presented content element;
   e) extracting the global mark and the local mark from the detected part of the content element;
   f) identifying the extracted local mark by a local watermark resolution server and the global mark by a global watermark resolution server; and
   g) identifying the content element based on the global and local mark.

2. The method according to claim 1, wherein the presenting of step c) is performed by visually displaying and/or audio play of the content element.

3. The method according to claim 2, wherein the local mark is provided to be a unique identifier for a location of the presenting according to step c).

4. The method according to claim 2, wherein additional local information is determined for identifying the content element.

5. The method according to claim 4, wherein the additional local information includes local temperature, local crowd density, local dwell time and/or local noise level.

6. The method according to claim 1, wherein the local mark is provided to be a unique identifier for a location of the presenting according to step c).

7. The method according to claim 6, wherein additional local information is determined for identifying the content element.

8. The method according to claim 1, wherein additional local information is determined for identifying the content element.

9. The method according to claim 8, wherein the additional local information includes local temperature, local crowd density, local dwell time and/or local noise level.

10. The method according to claim 8, wherein the additional local information is encoded in the local mark.

11. The method according to claim 1, further comprising providing an additional local content element and/or an additional global content element to a user terminal dependent on a result of step g).

12. The method according to claim 11, wherein the additional local content element and/or the additional global content element is provided based on the additional local information.

13. The method according to claim 1, wherein the user is identified, and based on the identification of the user, the local and/or global content element is provided.

14. The method according to claim 1, wherein the identifying the content element based on the global and local mark provides proof-of-play and/or proof-of-attention.

15. A system for identifying content, for performing the method according to claim 1, the system comprising:
 a user terminal presenting a content element;
 the global watermark generation device configured to mark the content element with the global mark;
 the local server in the local cluster configured to mark the content element with the local mark;
 a global identification system configured to identify the content element based on the global mark, the global identification system including the global watermark resolution server; and
 a local identification system configured to identify the content element based on the local mark, the local identification system including the local watermark resolution server,
 wherein the user terminal is configured to detect at least part of the presented content element, to extract the global mark from the detected part of the presented content element, and to extract the local mark from the detected part of the presented content element.

16. The system according to claim 15, further comprising at least one local sensor configured to sense a local physical parameter, including one or more of a local temperature, a local crowd density, a local dwell time, and a local noise level.

17. The system according to claim 15, further comprising at least one local cluster, each cluster comprising the local server, the local watermark resolution server, and/or an additional local content element.

18. The system according to claim 17, wherein each cluster further comprises at least one local sensor.

19. The system according to claim 15, further comprising a global cluster comprising the global watermark generation device, an additional global content device, and/or the global identification system.

20. The system according to claim 15, further comprising an additional local content device and/or an additional global content device for providing an additional local content element and/or an additional global content element to the user terminal dependent on a result provided by the global identification system and/or the local identification system.

* * * * *